US011203017B2

(12) United States Patent
Nielsen et al.

(10) Patent No.: US 11,203,017 B2
(45) Date of Patent: Dec. 21, 2021

(54) MICROFLUIDIC APPARATUSES (71) Applicant: HEWLETT-PACKARD DEVELOPMENT COMPANY, L.P., Houston, TX (US)

(72) Inventors: Jeffrey A Nielsen, Corvallis, OR (US); Manish Giri, Corvallis, OR (US); Chantelle Domingue, Corvallis, OR (US); Kenneth Ward, Corvallis, OR (US); Christie Dudenhoefer, Corvallis, OR (US); Matthew David Smith, Corvallis, OR (US); Joshua M. Yu, Corvallis, OR (US); Diane R. Hammerstad, Corvallis, OR (US); Hilary Ely, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 402 days.

(21) Appl. No.: 16/099,668

(22) PCT Filed: Jul. 26, 2016

(86) PCT No.: PCT/US2016/044097
§ 371 (c)(1),
(2) Date: Nov. 7, 2018

(87) PCT Pub. No.: WO2018/022025
PCT Pub. Date: Feb. 1, 2018

(65) Prior Publication Data
US 2019/0151849 A1 May 23, 2019

(51) Int. Cl.
*B01L 3/00* (2006.01)
*B01L 3/02* (2006.01)
(Continued)

(52) U.S. Cl.
CPC ....... *B01L 3/502761* (2013.01); *B01L 3/0268* (2013.01); *G01N 15/1031* (2013.01);
(Continued)

(58) Field of Classification Search
CPC ............. B01L 3/502761; B01L 3/0268; B01L 2300/0663; B01L 2300/0829;
(Continued)

(56) References Cited

U.S. PATENT DOCUMENTS 6,112,605 A 9/2000 Papen et al.
7,563,244 B2 7/2009 Kent et al.
(Continued)

FOREIGN PATENT DOCUMENTS

CN 101474541 A 7/2009
CN 101784390 A 7/2010
(Continued)

OTHER PUBLICATIONS

Andre Gross et al. "Single-Cell Printer: Automated, On Demand, and Label Free" Journal of Laboratory Automation Society for Laboratory Automation and Screening, Nov. 12, 2013 (Nov. 12, 2013), pp. 504-518, XP055276802, Retrieved from the Internet: URL:http://jla.sagepub.com/content/18/6/504.full.pdf [retrieved on May 31, 2016].

(Continued)

*Primary Examiner* — Samuel P Siefke
*Assistant Examiner* — Oyeleye Alexander Alabi
(74) *Attorney, Agent, or Firm* — Perry + Currier Inc (57) ABSTRACT

According to an example, a microfluidic apparatus may include a channel, a foyer, in which the foyer is in fluid communication with the channel and in which the channel has a smaller width than the foyer, a sensor to sense a property of a fluid passing through the channel, a nozzle in fluid communication with the foyer, and an actuator posi- (Continued)

tioned in line with the nozzle. The microfluidic apparatus may also include a controller to determine whether the sensed property of the fluid meets a predetermined condition and to perform a predefined action in response to the sensed property of the fluid meeting the predetermined condition.

8 Claims, 6 Drawing Sheets

(51) Int. Cl.
*G01N 15/10* (2006.01)
*G01N 35/10* (2006.01)
*G01N 15/14* (2006.01)

(52) U.S. Cl.
CPC ..... *G01N 15/1056* (2013.01); *G01N 35/1011* (2013.01); *G01N 35/1016* (2013.01); *G01N 35/1072* (2013.01); *G01N 35/1074* (2013.01); *B01L 2200/025* (2013.01); *B01L 2200/0652* (2013.01); *B01L 2200/12* (2013.01); *B01L 2200/143* (2013.01); *B01L 2300/0663* (2013.01); *B01L 2300/0829* (2013.01); *B01L 2300/0883* (2013.01); *B01L 2300/16* (2013.01); *B01L 2400/0439* (2013.01); *G01N 15/1484* (2013.01); *G01N 2015/1006* (2013.01); *G01N 2035/1041* (2013.01); *G01N 2035/1062* (2013.01)

(58) Field of Classification Search
CPC ....... B01L 2300/0883; B01L 2200/025; B01L 2200/0652; B01L 2200/12; B01L 2200/143; G01N 15/1031; G01N 15/1056; G01N 35/1011; G01N 35/1016; G01N 35/1072; G01N 35/1074; G01N 15/1484; G01N 2015/1006; G01N 2035/1041; G01N 2035/1062
See application file for complete search history.

(56) References Cited

U.S. PATENT DOCUMENTS

| | | | |
|---|---|---|---|
| 7,819,847 | B2 | 10/2010 | Vitello et al. |
| 8,543,417 | B1 | 9/2013 | Jackson |
| 8,562,095 | B2 | 10/2013 | Alleyne et al. |
| 8,580,569 | B2 | 11/2013 | Linder et al. |
| 9,116,124 | B2 | 8/2015 | Linder et al. |
| 2003/0215957 | A1* | 11/2003 | Lemmo .............. G01N 35/1065 436/180 |
| 2005/0221339 | A1 | 10/2005 | Griffiths et al. |
| 2013/0095469 | A1 | 4/2013 | Koltay et al. |
| 2015/0064694 | A1 | 3/2015 | Sadri |
| 2015/0253271 | A1 | 9/2015 | Giridhar et al. |

FOREIGN PATENT DOCUMENTS

| | | |
|---|---|---|
| CN | 104094122 A | 10/2014 |
| CN | 104641240 A | 5/2015 |
| CN | 105188938 A | 12/2015 |
| CN | 105283760 A | 1/2016 |
| JP | 2000503772 A | 3/2000 |
| JP | 2007526762 A | 9/2007 |
| JP | 2009100698 A | 5/2009 |
| JP | 2012127922 A | 7/2012 |
| JP | 2012520668 A | 9/2012 |
| WO | WO-2015173710 A2 | 11/2015 |
| WO | WO-2016053181 A1 | 4/2016 |

OTHER PUBLICATIONS

J. Schoendube et al. "Single-cell printing based on impedance detection", Biomicrofluidics, vol. 9, No. 1, Feb. 11, 2015 (Feb. 11, 2015), p. 014117, XP055575870, DOI: 10.1063/1.4907896.

* cited by examiner

```
┌─────────────────────────────────────────┐
│ DETECT, AT A CHANNEL OF A MICROFLUIDIC  │
│ DEVICE, A PROPERTY OF A FLUID PASSING   │
│ THROUGH THE CHANNEL INTO A FOYER OF THE │
│         MICROFLUIDIC DEVICE             │
│                  602                    │
└─────────────────────────────────────────┘
                    │
                    ▼
┌─────────────────────────────────────────┐
│  DETERMINE WHETHER THE DETECTED PROPERTY│
│     MEETS A PREDETERMINED CONDITION     │
│                  604                    │
└─────────────────────────────────────────┘
                    │
                    ▼
┌─────────────────────────────────────────┐
│ IN RESPONSE TO A DETERMINATION THAT THE │
│      DETECTED PROPERTY MEETS THE        │
│  PREDETERMINED CONDITION, PERFORM A     │
│           PREDEFINED ACTION             │
│                  606                    │
└─────────────────────────────────────────┘
```

MICROFLUIDIC APPARATUSES

BACKGROUND

Microfluidics applies across a variety of disciplines including engineering, physics, chemistry, microtechnology and biotechnology. Microfluidics involves the study of small volumes, e.g., microliters, picoliters, or nanoliters, of fluid and how to manipulate, control and use such small volumes of fluid in various microfluidic systems and devices such as microfluidic devices or chips. For example, microfluidic biochips (which may also be referred to as a "lab-on-chip") are used in the field of molecular biology to integrate assay operations for purposes such as analyzing enzymes and DNA, detecting biochemical toxins and pathogens, diagnosing diseases, etc.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are microfluidic apparatuses containing a microfluidic device or multiple microfluidic devices and methods for implementing the microfluidic device or devices. A microfluidic system disclosed herein may also include the microfluidic apparatus or a plurality of similarly configured microfluidic apparatuses. The microfluidic device may include a channel through which fluid from a fluid slot is to flow into a foyer (or equivalently, a chamber) from which the fluid may be dispensed through a nozzle in the foyer. A sensor may be positioned to sense a property of a fluid passing through the channel. In addition, a controller may determine an electrical conductivity of the fluid, a property of a particle of interest, e.g., a cell, or the like, from signals received from the sensor. For instance, the sensor may generate an electrical field through which the fluid may pass and the controller may determine a change in the electrical field, e.g., impedance, caused by the field passing through the electrical field.

The controller may also determine whether the sensed property of the fluid meets a predetermined condition. In response to a determination that the sensed property of the fluid meets the predetermined condition, the controller may perform a predefined action. The predefined action may be a modification to a dispense protocol of a microfluidic system containing the microfluidic device. Various examples of the predetermined conditions and predefined actions are discussed herein.

Through implementation of the microfluidic devices and methods disclosed herein, fluid may be dispensed to desired locations based upon a sensed or detected property of the fluid. Thus, for instance, the locations at which different fluids may be dispensed may depend upon the properties of the fluids. In this regard, the fluids may be dispensed to various locations through implementation of a closed-loop sensing and dispensing process. In addition, the fluid may be dispensed in small quantities such as in microliter or picoliter volumes.

By way of particular example, the particles of interest are cells, which are the basic structural and functional unit of an organism. Most animal and plant cells range in size from 1-100 micrometers and contain vital health information. In many instances, cell-based diagnostics are the gold standard for detecting infection diseases (HIV, Malaria, Tuberculosis), as well as chronic diseases (cancer, cardiac diseases, autoimmune diseases). The microfluidic devices and methods described herein may be used to provide a configurable and mobile platform for health diagnostics.

Figure 1A:
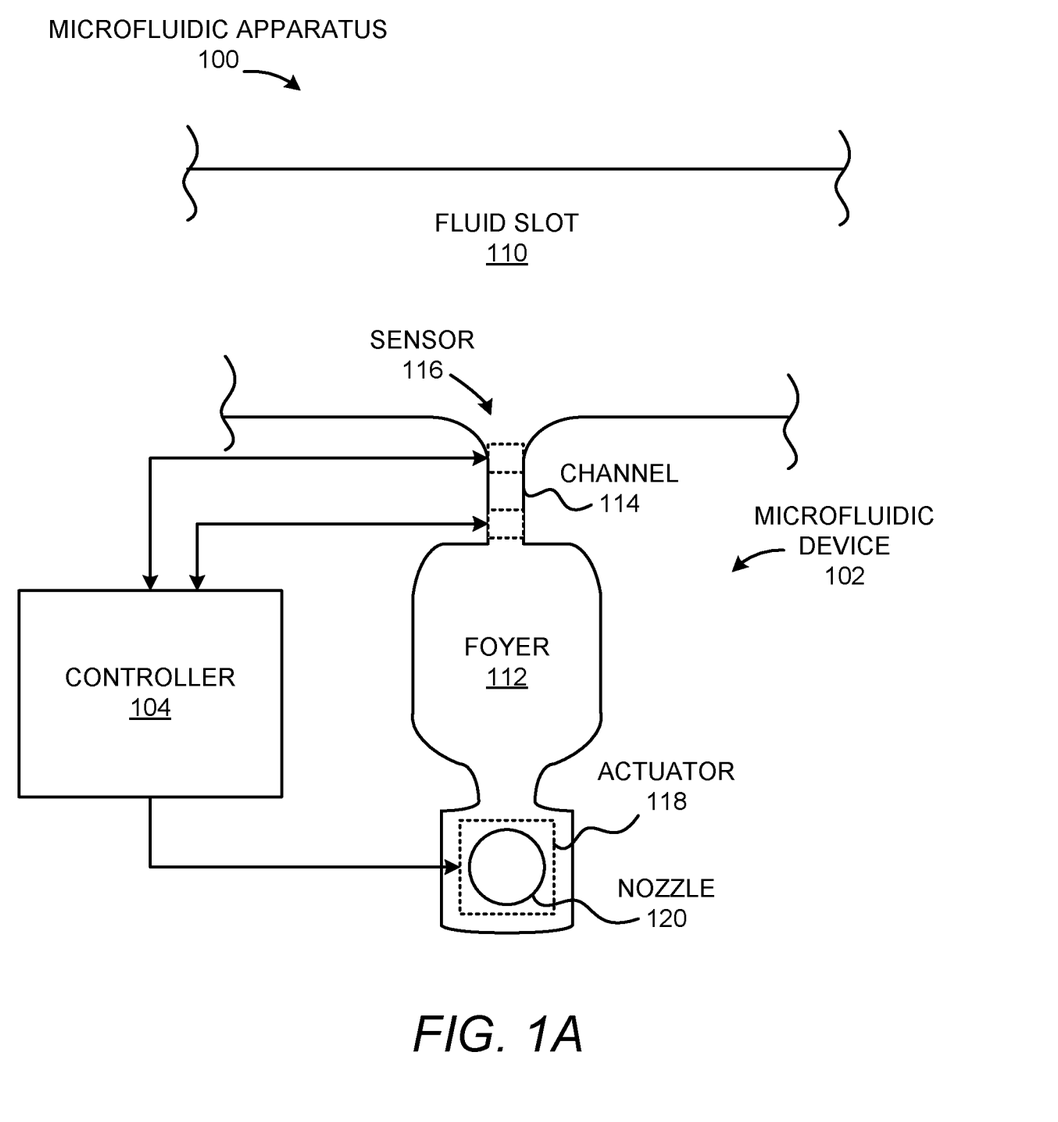
FIG. 1A shows a simplified block diagram of an example microfluidic apparatus.

With reference first to FIG. 1A, there is shown a simplified block diagram of an example microfluidic apparatus 100. It should be understood that the microfluidic apparatus 100 depicted in FIG. 1A may include additional components and that some of the components described herein may be removed and/or modified without departing from a scope of the microfluidic apparatus 100 disclosed herein.

The microfluidic apparatus 100 is depicted as including a microfluidic device 102 and a controller 104. The microfluidic device 102 is depicted as including a fluid slot 110 and a foyer 112, in which the foyer 112 is in fluid communication with the fluid slot 110 via a channel 114. A portion of the fluid slot 110 is shown and may supply fluid to multiple microfluidic devices 102 housed in the microfluidic apparatus 100. The channel 114 is depicted as having a smaller width than the foyer 112 such that the channel 114 may be considered as being pinched with respect to the foyer 112. Although the channel 114 has been depicted as having a linear configuration, the channel 114 may include other shapes, such as a curved shape, a snake-like shape, a shape with corners, combinations thereof, or the like.

A sensor 116 may be positioned to detect a property of a fluid flowing from the fluid slot 110 and into the foyer 112 through the channel 114. As discussed in greater detail herein, the sensor 116 may detect a presence of a particle of interest, e.g., a cell or other particle, in the fluid as the fluid passes through the channel 114. For instance, the fluid contained in the fluid slot 110 may be a host fluid having particles (e.g., a blood sample containing cells, an ink containing pigments/particles, or the like).

The sensor 116 may be an impedance sensor formed using semiconductor techniques and may be implemented using alternating current (AC) or direct current (DC) sensing. The sensor 116 may detect impedance changes as particles in the fluid pass by the sensor 116 through the channel 114. In this example, the sensor 116 may include metal electrodes that may form an electrical field through which the particles may pass. In another example, the sensor 116 may include a photodetector, e.g., a laser source and a photodiode, and may detect cells or particles based upon detected changes in light.

The microfluidic device 102 is also depicted as including an actuator 118 and a nozzle 120 in fluid communication with the foyer 112. As shown, the actuator 118 may be positioned in line with the nozzle 120. For instance, the actuator 118 may be positioned directly above or below the nozzle 120. In addition, activation of the actuator 118 may cause some of the fluid contained in the foyer 112 to be dispensed or expelled out of the microfluidic device 102 through the nozzle 120. In general, the structures and components of the microfluidic device 102 may be fabricated using integrated circuit microfabrication techniques such as electroforming, laser ablation, anisotropic etching, sputtering, dry and wet etching, photolithography, casting, molding, stamping, machining, spin coating, laminating, and the like. By way of particular example, the structures and components of the microfluidic device 102 may be formed of silicon.

According to an example, the controller 104 may supply power, e.g., AC or DC, to the sensor 116 and may detect, based upon measurements obtained by the sensor 116, when a particle of interest, e.g., a cell, a particular type of cell, etc., has passed through the channel 114. In addition, the sensor 116 may provide an electrical output signal representing the sensor data to the controller 104. In response to a determination that a particle of interest has passed through the channel 114, the controller 104 may activate the actuator 118 to expel fluid contained in the foyer 112 through the nozzle 120. In one regard, therefore, the controller 104 may control the actuator 118 in a closed-loop feedback manner based upon the detected particle of interest. The actuator 118 may be a thermal resistor that produces vapor bubbles to create fluid displacement within the foyer 112. In other examples, the actuator 118 may be implemented as piezo elements (e.g., PZT) whose electrically induced deflections generate fluid displacements within the foyer 112. In still other examples, the actuator 118 may be other types of deflective membrane elements activated by electrical, magnetic, and other forces.

The controller 104 may activate the actuator 118 a predefined number of times to expel the sensed particle of interest from the foyer 112 in instances in which less than all of the fluid contained in the foyer 112 is expelled during a single activation of the actuator 118. The predefined number of times may correspond to the number of times that the actuator 118 is to be activated in order to expel most or all of the fluid contained in the foyer 112 immediately following detection of the particle of interest. That is, for instance, the predefined number of times may correspond to the number of times that the actuator 118 is to be activated in order to cause the particle of interest contained in the foyer 112 to be expelled.

The controller 104 may be a computing device, a semiconductor-based microprocessor, a central processing unit (CPU), an application specific integrated circuit (ASIC), and/or other hardware device. The controller 104 may receive power from a power source or a power supply (not shown) and may supply AC or DC power to the sensor 116.

Figure 1B:
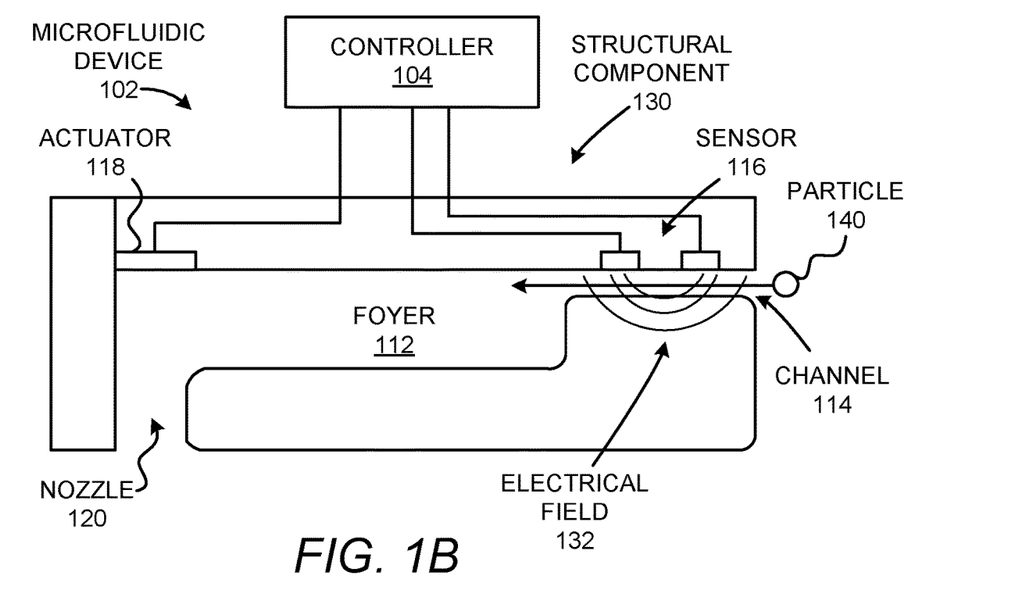
FIG. 1B shows a simplified cross-sectional side view of the example microfluidic device shown in FIG. 1A.

Turning now to FIG. 1B, there is shown a simplified cross-sectional side view of the example microfluidic device 102 shown in FIG. 1A. The microfluidic device 102 may be formed of a structural component 130, which may be formed of silicon, a polymeric material, an epoxy-based negative photoresist (such as SU-8), or the like. The structural component 130 may be formed through implementation of microfabrication techniques such as electroforming, laser ablation, anisotropic etching, sputtering, dry and wet etching, photolithography, casting, molding, stamping, machining, spin coating, laminating, and the like. In any regard, the actuator 118 and the components of the sensor 116 may be formed into the structural component through integrated circuit fabrication techniques. In addition, the channel 114 and the nozzle 120 may be formed through the structural component 130, for instance, by etching.

According to an example, the channel 114 may have a cross-section that is sized such that a single particle, e.g., cell, may pass through the channel 114 at one time. In this example, the channel 114 may be sized based upon the size of the particle 140 and may be slightly larger than the particle 140. By way of particular example, the channel 114 may have a height and a width that ranges from between about 5 microns and about 100 microns and a length that ranges from between about 5 microns and about 500 microns. As used herein, the term "about" may be defined as being between ±2 microns and ±100 microns. The nozzle 120 may be sized such that fluid contained in the foyer 112 may substantially be prevented from unintentionally being dispensed through the nozzle 120. That is, for instance, the nozzle 120 may be sized such that surface tension of the fluid prevents the fluid from being expelled by gravitational forces while allowing a predetermined amount of fluid to be expelled when the actuator 118 is activated. In addition, the nozzle 120 may be sized such that a portion of the fluid contained in the foyer 112 may evaporate through the nozzle 120.

The controller 104 may supply power to the sensor 116, which may generate an electrical field 132. As fluid containing a particle of interest, or simply particle 140, such as a cell, is moved through the channel 114 as indicated by the arrow, the electrical field 132 may be disturbed. The amount of disturbance, e.g., change in impedance, detected by the sensor 116 may vary depending upon the properties of the fluid, the type of particle 140 detected, etc. For instance, the amount of disturbance may vary for fluids having different electrical conductivity, light transmissivity, or other properties. As another example, a first type of cell may cause a first change in impedance to be detected, a second type of cell may cause a second change in impedance to be detected, etc. In other examples in which the sensor 116 includes a light source and a photodetector, particles 140 having different characteristics may cause different changes in the detected light. In these examples, one of the sensor 116 elements may be provided on a top of the channel 114 and another one of the sensor 116 elements may be provided on a bottom of the channel 114.

In any regard, the controller 104 may receive signals from the sensor 116 pertaining to the changes in the detected conditions. For instance, changes in the electrical field or the detected light as the fluid flows past the sensor 116 may cause changes in an electrical signal communicated to the controller 104. The changes may include, for instance, changes in current and the controller 104 may determine changes in impedance from the received electrical signals. In addition, the controller 104 may determine a sensed property of the fluid passing through the channel 114 from the received signals. The controller 104 may determine the electrical conductivity of the fluid from the received electrical signals. In another example, the controller 104 may determine the type of a particle detected in the channel 114 from the received electrical signals. In this example, the controller 104 may determine the type of the particle by comparing the received electrical signals, e.g., change in impedance levels, with the electrical signals of known particle types.

The controller 104 may also determine whether the sensed property of the fluid meets a predetermined condition and may perform a predefined action in response to the sensed property of the fluid meeting the predetermined condition. In one example, the predetermined condition may be a predetermined electrical conductivity level of the fluid and the controller 104 may determine that the sensed property of the fluid meets the predetermined condition in response to the sensed electrical conductivity level of the fluid exceeding the predetermined electrical conductivity level. Likewise, the controller 104 may determine that the sensed property of the fluid fails to meet the predetermined condition in response to the sensed electrical conductivity level of the fluid falling below the predetermined electrical conductivity level. In another example, the predetermined condition may be a predetermined type of particle, e.g., a predetermined type of cell. In this example, the controller 104 may determine that the sensed property of the fluid meets the predetermined condition in response to the sensed property of the fluid indicating that a particle of the predetermined type has been detected. Likewise, the controller 104 may determine that the sensed property of the fluid fails to meet the predetermined condition in response to the sensed property of the fluid indicating that a particle of the predetermined type has not been detected.

According to an example, the predefined action may include a protocol modification pertaining to dispensing of the fluid, e.g., a dispense protocol applied to the fluid contained in the foyer 112. The protocol modification may include, for instance, changing a dispensing location of the fluid contained in the foyer 112, changing an order in which the fluid contained in the foyer 112 and another fluid contained in another foyer 112 are dispensed, changing a quantity of fluid dispensed into a well, dispensing a second fluid into a well into which the fluid was dispensed, dispensing the second fluid at a specific time following a determination that the sensed property of the fluid meets the predetermined condition, combinations thereof, or the like. During or following modification of the dispense protocol, the controller 104 may activate the actuator 118 to cause fluid contained in the foyer 112 to be expelled through the nozzle 120 and/or may activate a second actuator to cause fluid contained in the foyer of another microfluidic device to be expelled.

The fluid contained in the foyer 112 may not be completely expelled when the actuator 118 is activated. According to an example, the controller 104 may cause the actuator 118 to be activated a predetermined number of times to cause all or substantially all of the fluid contained in the foyer 112 to be expelled. The predetermined number of times may be equivalent to a number of times that may result in the clearing of the fluid contained in the foyer 112 to ensure that the particle of interest 140 is expelled from the foyer 112. Thus, for instance, if a single activation of the actuator 118 results in a quarter of the fluid contained in the foyer 112 to be expelled, the controller 104 may cause the actuator 118 to be activated four times to ensure that the particle of interest is expelled from the foyer 112.

Figure 2:
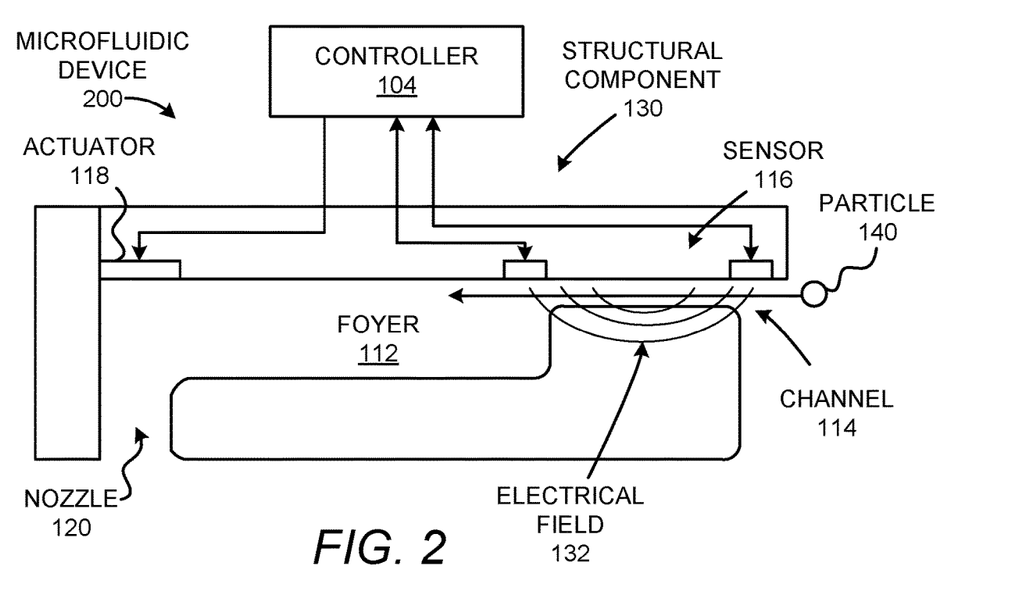
FIG. 2 shows a simplified cross-sectional side view of another example microfluidic device.

Turning now to FIG. 2, there is shown a simplified cross-sectional side view of another example microfluidic device 200. The microfluidic device 200 shown in FIG. 2 includes most of the same features as the microfluidic device 102 depicted in FIG. 1B and thus, common features will not be described in detail. The microfluidic device 200 shown in FIG. 2, however, differs from the microfluidic device 102 depicted in FIG. 1B in that the sensor 116 elements are positioned outside of the channel 114. That is, one of the sensor 116 elements is depicted as being positioned at an inlet of the channel 114 and the other one of the sensor 116 elements is depicted as being positioned at an outlet of the channel 114.

Figure 3:
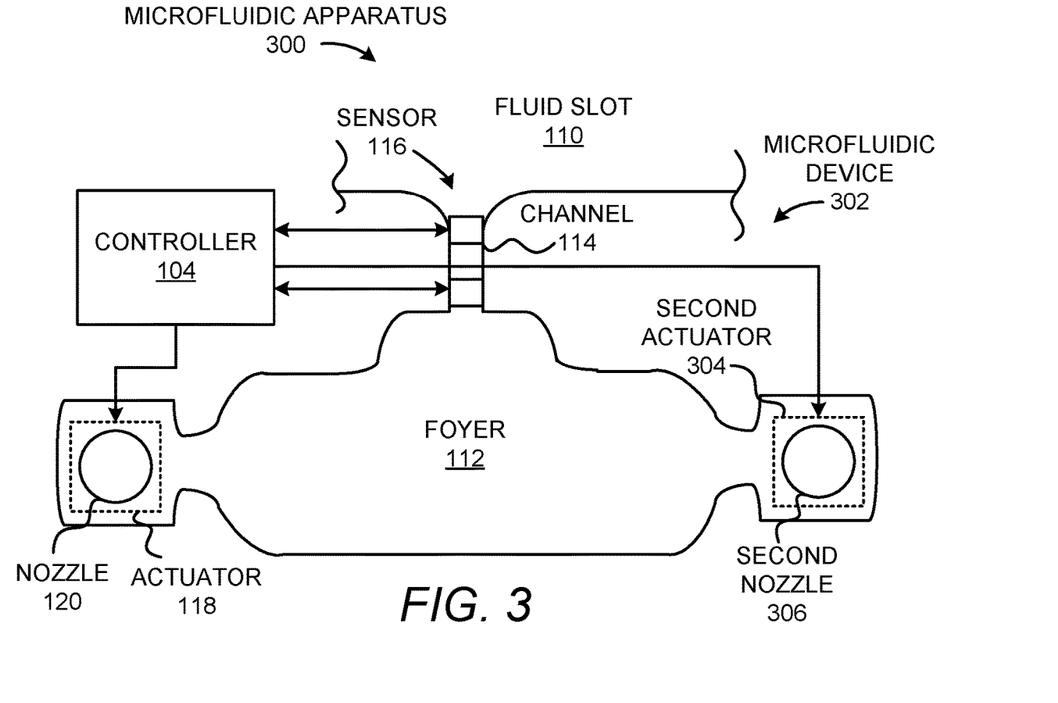
FIG. 3 shows a simplified block diagram of another example microfluidic apparatus.

Turning now to FIG. 3, there is shown a simplified block diagram of another microfluidic apparatus 300. The microfluidic apparatus 300 shown in FIG. 3 includes most of the same features as the microfluidic apparatus 100 depicted in FIG. 1A and thus, common features will not be described in detail. The microfluidic apparatus 300 shown in FIG. 3, however, differs from the microfluidic apparatus 100 depicted in FIG. 1A in that the microfluidic device 302 includes different features as compared with the microfluidic device 102. Particularly, the microfluidic device 302 may include a second actuator 304 and a second nozzle 306. The second actuator 304 may be positioned in-line with the second nozzle 306 and may be positioned on an opposite side of the foyer 112 with respect to the actuator 118. The second actuator 304 may also be implemented as similar types of actuators as the actuator 118, e.g., thermal resistor, PZT, etc.

As also shown in FIG. 3, the controller 104 may control the second actuator 304, e.g., through a communication or signal line. That is, the controller 104 may supply energy to the second actuator 304 to cause the second actuator 304 to become activated and therefore cause some of the fluid contained in the foyer 112 to be expelled through the second nozzle 306. The controller 104 may activate the actuator 118 and the second actuator 304 in a sequence in response to a detection that a particle of interest has passed through the channel 114 and into the foyer 112. In addition, the controller 104 may activate the actuator 118 and the second actuator 304 a predetermined number of times until a volume of fluid equal to or substantially equal to the volume of fluid contained in the foyer 112 at the time the particle of interest was detected to have moved through the channel 114 has been expelled from the foyer 112.

According to an example, the second nozzle 306 may function as a pressure relief during activation of the actuator 118 and the nozzle 120 may function as a pressure relief during activation of the second actuator 304. That is, when the actuator 118 (or the second actuator 304) is activated, pressure may be applied to the fluid contained in the foyer 112, which may cause some of the fluid to be forced back through the channel 114. A portion of the fluid contained in the foyer 112 may be expelled through the second nozzle 306 when the actuator 118 is activated to prevent the fluid from being forced back through the channel 114.

Although the microfluidic devices 102 and 302 have been depicted as respectively having a single actuator 118 and two actuators 118, 302, it should be understood that the microfluidic devices 102, 302 disclosed herein may include a larger number of actuators and corresponding nozzles without departing from a scope of the present disclosure.

Figure 4:
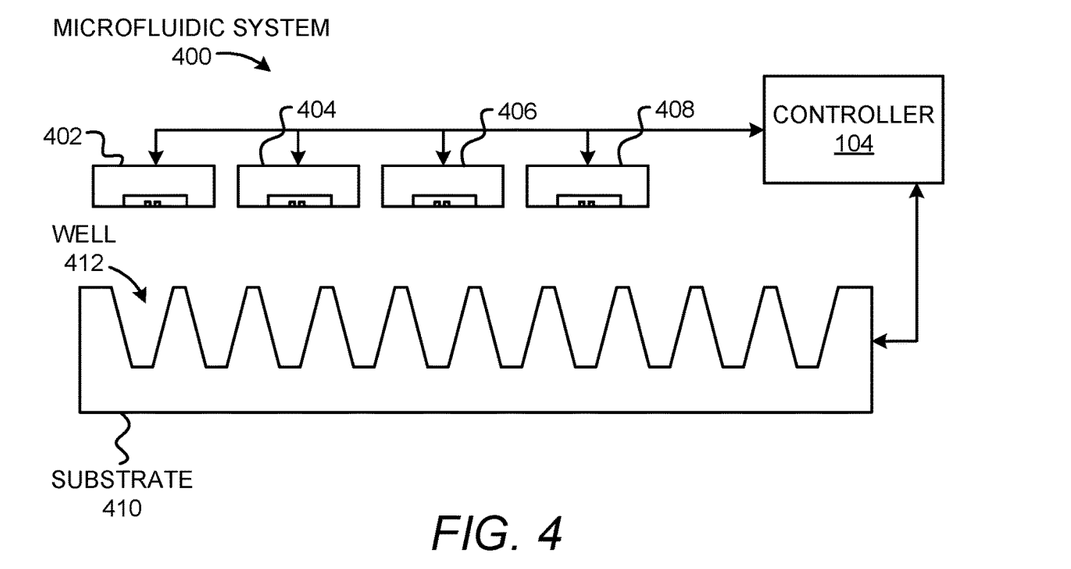
FIG. 4 shows a simplified block diagram of an example microfluidic system.

Turning now to FIG. 4, there is shown a simplified block diagram of an example microfluidic system 400. The microfluidic system 400 is depicted as including a plurality of microfluidic apparatuses 402-408, a substrate 410, and the controller 104. Each of the microfluidic apparatuses 402-408 may be configured as shown in either of FIGS. 1A and 3 and may each contain a plurality of microfluidic devices. The microfluidic devices may each be configured as shown in any of FIGS. 1A-3. For instance, each of the microfluidic apparatuses 402-408 may contain 6 or more microfluidic devices 102, 200, 302.

The substrate 410 is depicted as including a plurality of wells 412. According to an example, the substrate 410 may be movable in one dimension, two dimensions, or three-dimensions with respect to the microfluidic apparatuses 402-408. In this example, the controller 104 may control a motor or other actuator to move the substrate 410 with respect to the microfluidic apparatuses 402-408. For instance, the controller 104 may cause the substrate 410 to be moved such that a particular well 412 is positioned beneath a particular one of the microfluidic apparatuses 402-408. In this regard, different fluids may be inserted into each of the microfluidic apparatuses 402-408 and the controller 104 may individually control the microfluidic devices contained in the microfluidic apparatuses 402-408 to dispense the fluids into selected ones of the wells 412.

By way of particular example, the controller 104 may control the microfluidic devices to dispense fluid containing particles, e.g., cells, into individual wells 412. That is, the controller 104 may control the dispensing of the fluid in the wells 412 depending upon the detected property of the fluid. For instance, the controller 104 may modify a dispensing protocol based upon the detected property of the fluid, in which the modification of the dispensing protocol may cause the fluid to be dispensed into a different well 412 than would occur under the unmodified dispensing protocol. The controller 104 may move the substrate 410 such that a different well 412 is positioned beneath the microfluidic apparatus 402 containing the microfluidic device in order to comply with the modified dispensing protocol.

Figure 5:
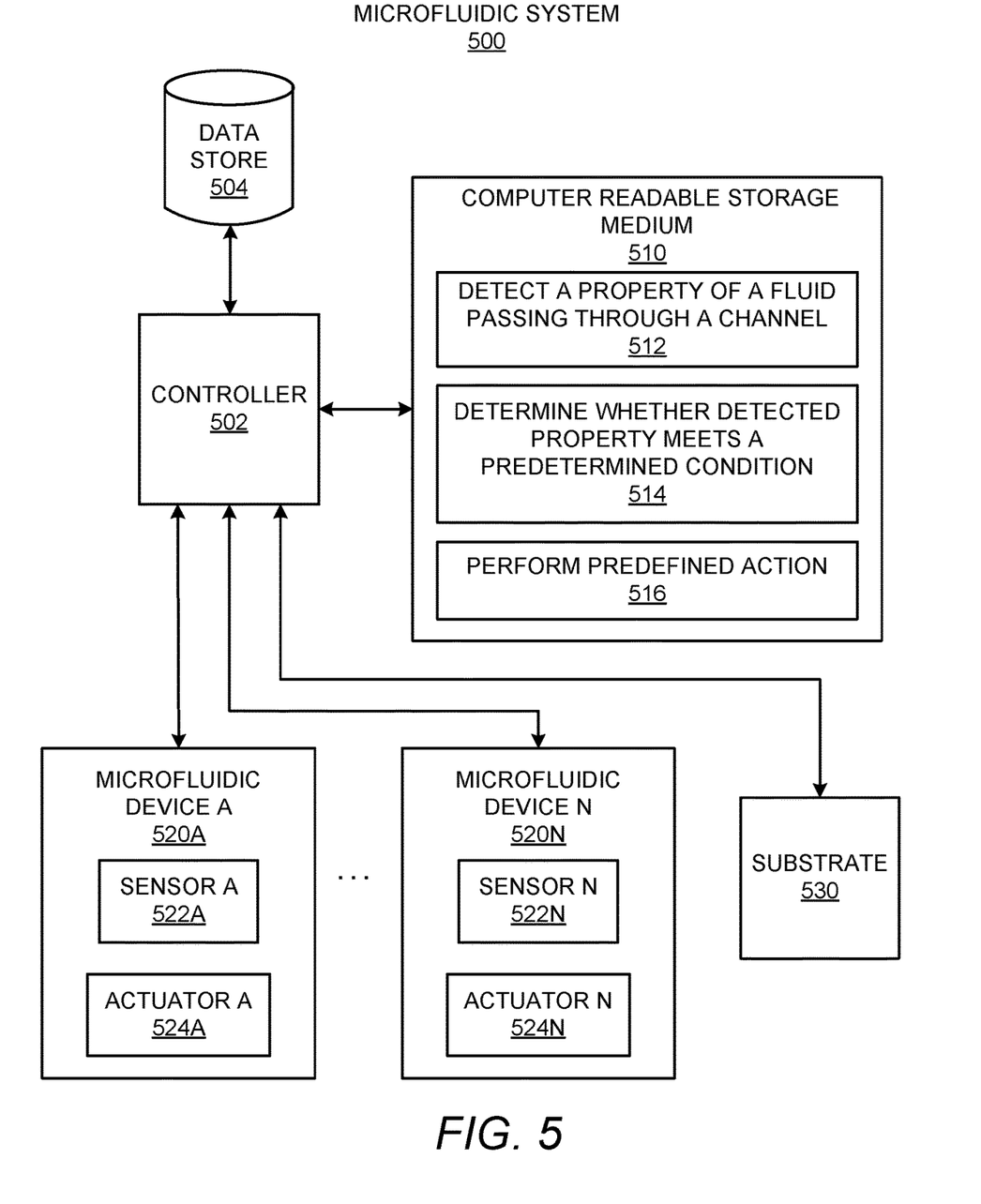
FIG. 5 depicts a simplified block diagram of an example microfluidic system.

With reference now to FIG. 5, there is shown a simplified block diagram of an example microfluidic system 500. It should be understood that the microfluidic system 500 depicted in FIG. 5 may include additional components and that some of the components described herein may be removed and/or modified without departing from a scope of the microfluidic system 500 disclosed herein.

The microfluidic system 500 is shown as including a controller 502 and a data store 504. The controller 502 may be the same as the controller 104 depicted in and described above with respect to FIG. 1A. The controller 502 may thus be a computing device, a semiconductor-based microprocessor, a central processing unit (CPU), an application specific integrated circuit (ASIC), a programmable logic device (PLD), and/or other hardware device. The controller 502 may also receive power from a power source or a power supply (not shown). The data store 504 may be Random Access Memory (RAM), an Electrically Erasable Programmable Read-Only Memory (EEPROM), a storage device, an optical disc, or the like.

The microfluidic system 500 may also include a computer readable storage medium 510 on which is stored machine readable instructions 512-516 that the controller 502 may execute. More particularly, the controller 502 may fetch, decode, and execute the instructions 512 to detect a property of a fluid passing through a channel 114. The controller 502 may fetch, decode, and execute the instructions 514 to determine whether the detected property meets a predefined condition. The controller 502 may fetch, decode, and execute the instructions 516 to perform a predefined action based upon whether the detected property meets a predefined condition. As an alternative or in addition to retrieving and executing instructions, the controller 502 may include one or more electronic circuits that include components for performing the functionalities of the instructions 512-516.

The computer readable storage medium 510 may be any electronic, magnetic, optical, or other physical storage device that contains or stores executable instructions. Thus, the computer readable storage medium 510 may be, for example, Random Access Memory (RAM), an Electrically Erasable Programmable Read-Only Memory (EEPROM), a storage device, an optical disc, and the like. The computer readable storage medium 510 may be a non-transitory machine-readable storage medium, where the term "non-transitory" does not encompass transitory propagating signals.

The microfluidic system 500 may further include a plurality of microfluidic devices 520a-520n, in which the variable "n" represents an integer value greater than one. Each of the microfluidic devices 520a-520n may be similar to one of the microfluidic devices 102, 200, 300 depicted in FIGS. 1A-3. In this regard, the microfluidic devices 520a-520n may each include a sensor 522a-522n and an actuator 524a-524n. In other examples, for instance, in microfluidic devices 300 having multiple actuators, the microfluidic devices 520a-520n may each include multiple actuators 524n. In addition, or alternatively, the microfluidic devices 520a-520n may include multiple sensors 522a-522n. In some examples, the microfluidic devices 520a-520n are housed in a single microfluidic apparatus. In some examples, a first group of the microfluidic devices 520a-520n is housed in a first microfluidic apparatus and a second group of the microfluidic devices 520a-520n is housed in a second microfluidic apparatus.

The microfluidic system 500 may further include a substrate 530, which may be similar to the substrate 410 depicted in FIG. 4. The controller 502 may control the substrate 530 such that selected wells 412 may be positioned to receive fluid from the desired ones of the microfluidic devices 520a-520n.

Figure 6:
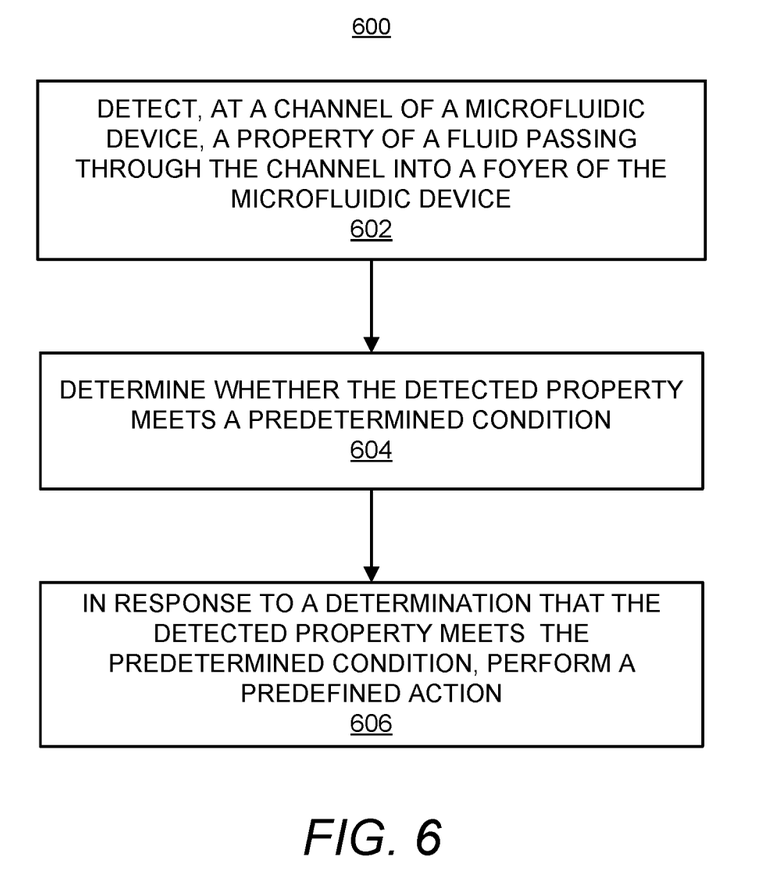
FIGS. 6 and 7, respectively, depict example methods for dispensing a fluid through a microfluidic device.
Figure 7:
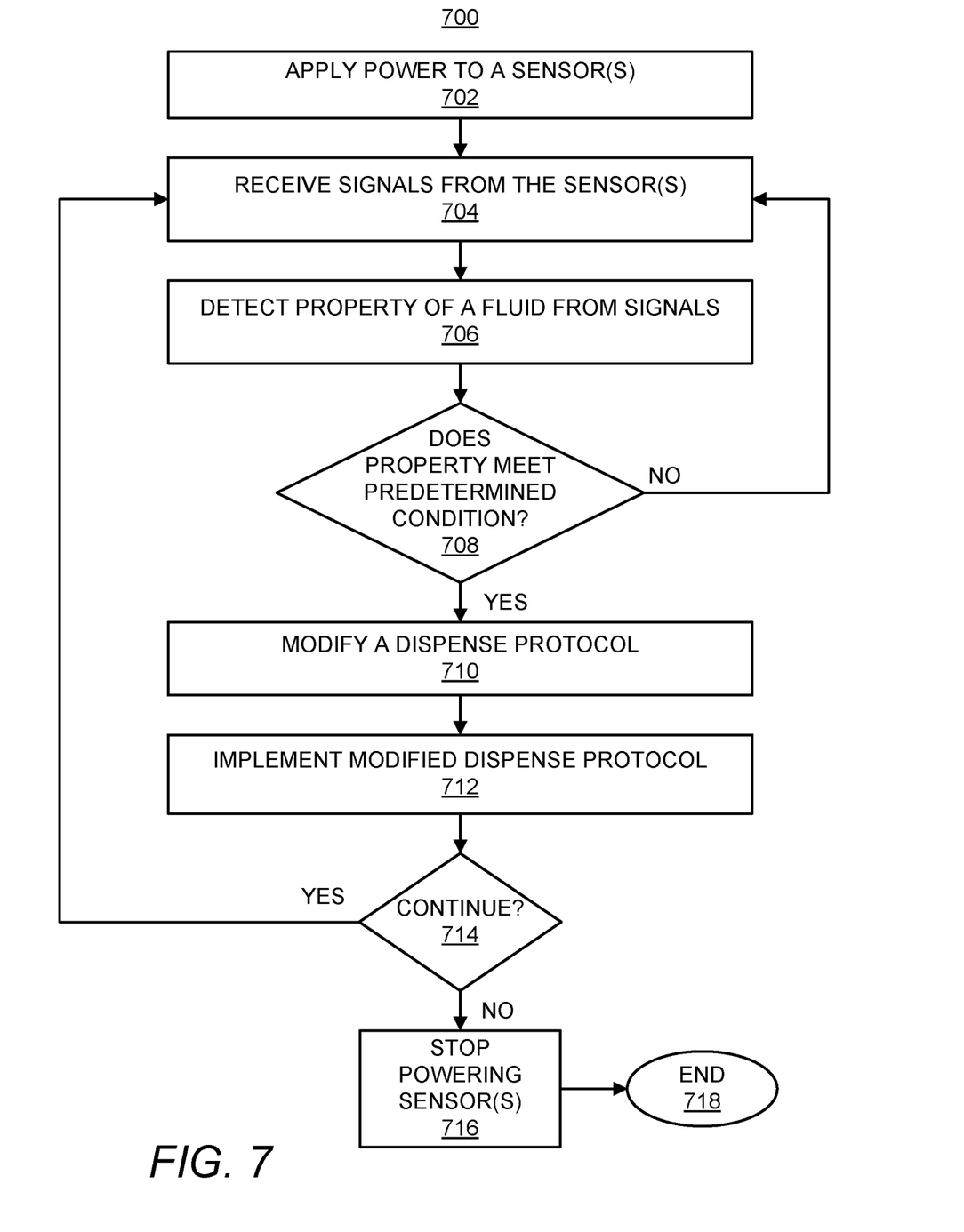

Various manners in which the microfluidic system 500 may be implemented are discussed in greater detail with respect to the methods 600 and 700 respectively depicted in FIGS. 6 and 7. Particularly, FIGS. 6 and 7, respectively, depict example methods 600 and 700 for dispensing fluid through a microfluidic device. It should be apparent to those of ordinary skill in the art that the methods 600 and 700 may represent generalized illustrations and that other operations may be added or existing operations may be removed, modified, or rearranged without departing from the scopes of the methods 600 and 700.

The descriptions of the methods 600 and 700 are made with reference to the microfluidic system 500 illustrated in FIG. 5 for purposes of illustration. It should, however, be clearly understood that microfluidic systems having other configurations may be implemented to perform either or both of the methods 600 and 700 without departing from scopes of the methods 600 and 700.

With reference first to FIG. 6, at block 602, a detection may be made, at a channel 114 of a microfluidic device 520a, of a property of a fluid passing through the channel 114 into a foyer 112 of the microfluidic device 520a. For instance, the controller 502 may execute the instructions 512 to detect a property of the fluid using signals received from a sensor 116 located near the channel 114. As discussed herein, the detected property may include, for instance, an electrical conductivity of the fluid, a light transmissivity of the fluid, whether a particle of interest 140 is contained in the fluid passing through the channel 114, or the like. The controller 502 may receive electrical signals from the sensor 116, e.g., from electrodes, photodiodes, etc., of the sensor 116, and may detect the property of the fluid from the received electrical signals. In another example, the sensor 116 may include a processor than may detect the property and may communicate the detected property to the controller 502.

At block 604, the controller 502 may determine whether the detected property of the fluid meets a predetermined condition. For instance, the controller 502 may execute the instructions 514 to make this determination. The predetermined condition may be a predetermined electrical conductivity level of the fluid and the controller 502 may determine that the sensed property of the fluid meets the predetermined condition in response to the sensed electrical conductivity level of the fluid exceeding the predetermined electrical conductivity level. Likewise, the controller 502 may determine that the sensed property of the fluid fails to meet the predetermined condition in response to the sensed electrical conductivity level of the fluid falling below the predetermined electrical conductivity level.

In another example, the predetermined condition may be a predetermined type of particle, e.g., a predetermined type of cell. In this example, the controller 502 may determine that the sensed property of the fluid meets the predetermined condition in response to the sensed property of the fluid indicating that a particle of the predetermined type has been detected. Likewise, the controller 502 may determine that the sensed property of the fluid fails to meet the predetermined condition in response to the sensed property of the fluid indicating that a particle of the predetermined type has not been detected.

At block 606, in response to a determination that the detected property meets the predetermined condition, the controller 502 may modify a dispense protocol of the microfluidic system 500. The controller 502 may execute the instructions 516 to perform a predefined action on the fluid contained in the foyer 112 in response to the detected property of the fluid meeting the predetermined condition. During or after performance of the predefined action, the controller 502 may activate an actuator 118 or multiple actuators 118, 304 in one microfluidic device 520a or multiple microfluidic devices 520a-520n to dispense a fluid or multiple fluids into wells 412 of the substrate 530 or other target locations. As discussed above, the controller 502 may activate the actuator(s) 118 a predetermined number of times to evacuate a predefined volume of fluid through a nozzle 120 from the foyer 112, in which the predefined volume of fluid is equivalent or nearly equivalent to a total volume of fluid contained in the foyer 112 prior to the foyer 112 being refilled with additional fluid.

According to an example, the predefined action may include a protocol modification pertaining to dispensing of the fluid, e.g., a dispense protocol applied to the fluid contained in the foyer 112. The protocol modification may include, for instance, changing a dispensing location of the fluid contained in the foyer 112, changing an order in which the fluid contained in the foyer 112 and another fluid contained in another foyer 112 are dispensed, changing a quantity of fluid dispensed into a well, dispensing a second fluid into a well into which the fluid was dispensed, dispensing the second fluid at a specific time following a determination that the sensed property of the fluid meets the predetermined condition, combinations thereof, or the like. During or following modification of the dispense protocol, the controller 502 may activate the actuator 118 to cause fluid contained in the foyer 112 to be expelled through the nozzle 120 and/or may activate a second actuator to cause fluid contained in the foyer of another microfluidic device to be expelled.

Turning now to FIG. 7, at block 702, power may be applied to a sensor 522a or to multiple sensors 522a-522n. For instance, the controller 502 may supply power to the sensor(s) 522a-522n such that the sensor(s) 522a-522n generate an electric field or other detection field, e.g., a laser beam and photodetector. As noted herein, the sensor(s) 522a-522n may be positioned to detect a property of a fluid as the fluid flows through a channel 114 of a microfluidic device 102, 200, 302 or multiple channels 114 of multiple microfluidic devices 102, 200, 302.

At block 704, the controller 502 may receive signals from the sensor(s) 522a-522n. For instance, the controller 502 may receive electrical signals from the electrodes of the sensor(s) 522a-522n. In another example, the controller 502 may receive electrical signals from a photodiode of the sensor(s) 522a-522n. In a yet further example in which the sensor(s) 522a-522n includes a processor, the controller 502 may receive detected information, such as detected current changes, detected electrical field strength changes, detected impedance information, information pertaining to changes in light detected by a photodetector, or the like.

At block 706, the controller 502 may detect a property of the fluid from the received signals. That is, the controller 502 may detect a property of the fluid as the fluid flows through the channel 114 and into the foyer 112. As discussed herein, the detected property of the fluid may include, for instance, a detected electrical conductivity level, light transmissivity level, detected particle property, or the like.

At block 708, the controller 502 may determine whether the detected property of the fluid meets a predetermined condition. For instance, the controller 502 may determine whether a detected particle has an electrical signature that matches a predetermined electrical signature, e.g., the detected particle causes a change in a detected impedance to vary by a predetermined amount. As another example, the controller 502 may determine whether the electrical conductivity of the fluid exceeds a predetermined electrical conductivity level.

In response to a determination at block 708 that the detected property does not meet the predetermined condition, the controller 502 may continue to receive signals from the sensor(s) 522a-522n at block 704, continue to detect a property of the fluid from the received signals at block 706, and continue to determine whether the detected property meets the predetermined condition at block 708. However, in response to a determination at block 708 that the detected property does meet the predetermined condition, the controller 502 may modify a dispense protocol of the microfluidic system 500 as indicated at block 710. By way of example in which the dispense protocol is to dispense fluid contained in the foyer 112 into a first well 412, the controller 502 may modify the dispense protocol in response to the detected property meeting the predetermined condition such that the fluid contained in the foyer 112 is dispensed into a different well.

At block 712, the controller 502 may implement the modified dispense protocol. For instance, the controller 502 may change a dispensing location of the fluid contained in the foyer 112, change an order in which the fluid contained in the foyer 112 and another fluid contained in another foyer 112 are dispensed, change a quantity of fluid dispensed into a well, dispense a second fluid into a well into which the fluid was dispensed, dispense the second fluid at a specific time following a determination that the sensed property of the fluid meets the predetermined condition, combinations thereof, or the like. During or following modification of the dispense protocol, the controller 502 may activate the actuator 118 to cause fluid contained in the foyer 112 to be expelled through the nozzle 120 and/or may activate a second actuator to cause fluid contained in the foyer of another microfluidic device to be expelled.

At block 714, the controller 502 may determine whether to continue the method 700. The controller 502 may determine that the method 700 is to be continued in response to a determination that an additional fluid is to be delivered into a well 412. In response to a determination that the method 700 is to continue, the controller 502 may repeat blocks 704-714 until the controller 140 determines that the method 700 is to end. Following the "no" condition at block 714, the controller 140 may stop supplying power to the sensor(s) 522a-522n as indicated at block 716. In addition, the controller 502 may end the method 700 as indicated at block 718.

Through implementation of the methods 600 and 700, fluids and/or particles of interest may be dispensed into desired locations, e.g., wells 412 in a substrate 410, based upon detected properties of the fluids and/or particles of interest. As such, for instance, the methods 600 and 700 may enable for closed-loop control of fluid dispending based upon the detected properties.

Some or all of the operations set forth in the methods 600 and 700 may be contained as programs or subprograms, in any desired computer accessible medium. In addition, the methods 600 and 700 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A microfluidic apparatus comprising:
   a channel;
   a foyer, wherein the foyer is in fluid communication with the channel and wherein the channel has a smaller width than the foyer;
   a sensor to sense an electrical conductivity of a fluid passing through the channel;
   a nozzle in fluid communication with the foyer;
   an actuator positioned in line with the nozzle; and
   a controller configured to determine whether the sensed electrical conductivity of the fluid meets a predetermined condition and configured to perform a predefined action in response to the sensed electrical conductivity of the fluid meeting the predetermined condition, wherein the predefined action includes at least one of changing a dispensing location of the fluid contained in the foyer, changing an order in which the fluid contained in the foyer and another fluid contained in another foyer are dispensed, changing a quantity of fluid dispensed into a well, dispensing a second fluid into a well into which the fluid was dispensed, and dispensing the second fluid at a specific time following a determination that the sensed electrical conductivity of the fluid meets the predetermined condition.

2. The microfluidic apparatus according to claim 1, wherein the controller is configured to perform the predefined action by modifying a dispense protocol applied to the fluid contained in the foyer.

3. The microfluidic apparatus according to claim 1, wherein the sensor is further to sense a predetermined type of particle contained in the fluid, and wherein the controller is to determine the predefined action in response to the second predetermined type of particle contained in the fluid meeting a further predetermined condition.

4. The microfluidic apparatus according to claim 1, further comprising:
   a second foyer containing the second fluid;
   a second nozzle; and
   a second actuator, wherein the controller is configured to activate the second actuator to cause second fluid in the second foyer to be dispensed through the second nozzle in response to the sensed electrical conductivity of the fluid meeting the predetermined condition.

5. The microfluidic apparatus according to claim 1, further comprising:
   a substrate containing a plurality of wells, wherein the controller is configured to control the actuator to cause fluid in the foyer to be dispensed through the nozzle and into a first well of the plurality of wells in response to the sensed property of the fluid meeting the predetermined condition and to control the actuator to cause fluid in the foyer to be dispensed through the nozzle and into a second well of the plurality of wells in response to the sensed electrical conductivity of the fluid not meeting the predetermined condition.

6. A microfluidic system comprising:
   a plurality of microfluidic devices, wherein each of the plurality of microfluidic devices comprises:
      a foyer in fluid communication with a channel having smaller cross section than the foyer;
      a sensor to sense an electrical conductivity of a fluid passing through the channel and into the foyer;
      a nozzle in fluid communication with the foyer;
      an actuator positioned in line with the nozzle; and
   a controller configured to modify a dispense protocol applied to the plurality of microfluidic devices based upon the sensed electrical conductivity of the fluid passing through the channels.

7. The fluid delivery system according to claim 6, wherein the controller is configured to modify the dispense protocol by at least one of changing a dispensing location of the fluid contained in the foyer, changing an order in which the fluid contained in the foyer and another fluid contained in another foyer are dispensed, changing a quantity of fluid dispensed into a well, dispensing a second fluid into a well into which the fluid was dispensed, and dispensing the second fluid at a specific time following a determination that the sensed electrical conductivity of the fluid meets the predetermined condition.

8. The fluid delivery system according to claim 6, wherein the controller is further configured to activate the actuator in a first microfluidic device of the plurality of microfluidic devices in response to a determination that the sensed electrical conductivity of a fluid passing through the channel in a second microfluidic device of the plurality of microfluidic devices meets a predetermined condition.

* * * * *